United States Patent [19]

Materna et al.

[11] Patent Number: 5,007,084
[45] Date of Patent: Apr. 9, 1991

[54] PAYMENT AUTHORIZATION AND INFORMATION DEVICE

[75] Inventors: Richard H. Materna, 705 St. Joseph Dr., Oak Brook, Ill. 60515; John S. Linse, 9418 Bay Colony Dr., Apt. 3 S., Des Plaines, Ill. 60016; Roy A. Richardson, Pinellas Park, Fla.

[73] Assignees: Richard H. Materna, Peoria; John S. Linse, Des Plaines, both of Ill.

[21] Appl. No.: 237,894

[22] Filed: Aug. 29, 1988

[51] Int. Cl.[5] .......................... H04L 9/06; G07F 7/08
[52] U.S. Cl. .......................... 380/24; 380/10; 380/18; 380/29; 380/50; 235/379; 235/381; 379/91; 379/93; 455/5
[58] Field of Search ............... 364/200, 900, 401, 408; 235/379–381; 379/91, 93; 455/5; 380/24, 25, 29, 49, 50, 7, 10, 18

[56] References Cited

U.S. PATENT DOCUMENTS

| | | | |
|---|---|---|---|
| 4,315,101 | 2/1982 | Atalla | 380/24 |
| 4,317,957 | 3/1982 | Sendrow | 380/24 |
| 4,319,336 | 3/1982 | Anderson et al. | 364/900 |
| 4,420,751 | 12/1983 | Paganini et al. | 235/379 X |
| 4,454,414 | 6/1984 | Benton | 235/379 |
| 4,634,845 | 1/1987 | Hale et al. | 235/380 |
| 4,689,478 | 8/1987 | Hale et al. | 235/380 |
| 4,695,880 | 9/1987 | Johnson et al. | 455/5 X |
| 4,734,858 | 3/1988 | Schlafly | 364/408 |

Primary Examiner—Stephen C. Buczinski
Assistant Examiner—Bernarr Earl Gregory
Attorney, Agent, or Firm—McAndrews, Held & Malloy, Ltd.

[57] ABSTRACT

A Payment Authorization and Information Device for users of credit cards and other forms of credit receives billing information by tape or the like from the provider of the credit cards or from any such provider of credit. In the preferred embodiment, such information, encoded and identified as to the particular user, is broadcast during the retrace time of a television broadcast signal. A user has a receiver that is tuned to the particular channel in which the credit information is broadcast. A Payment Authorization and Information Device at the user's location is enabled to read the billing information into memory and tell the user that he has been billed. The Payment Authorization and Information Device is connected by a modem to the telephone line to signal the provider or the Information Center that the information has been received.

At his convenience, the user operates the Payment Authorization and Information Device to print a bill and any other information sent by the provider or the Information Center. If the user wishes to pay the bill, the Payment Authorization and Information Device, upon his direction, will automatically dial the Informat4ion Center or his financial institution and direct payment of the stated amount to the named provider. If the user wishes to vary the amount paid, he may do so by typing instructions into a keyboard.

9 Claims, 3 Drawing Sheets

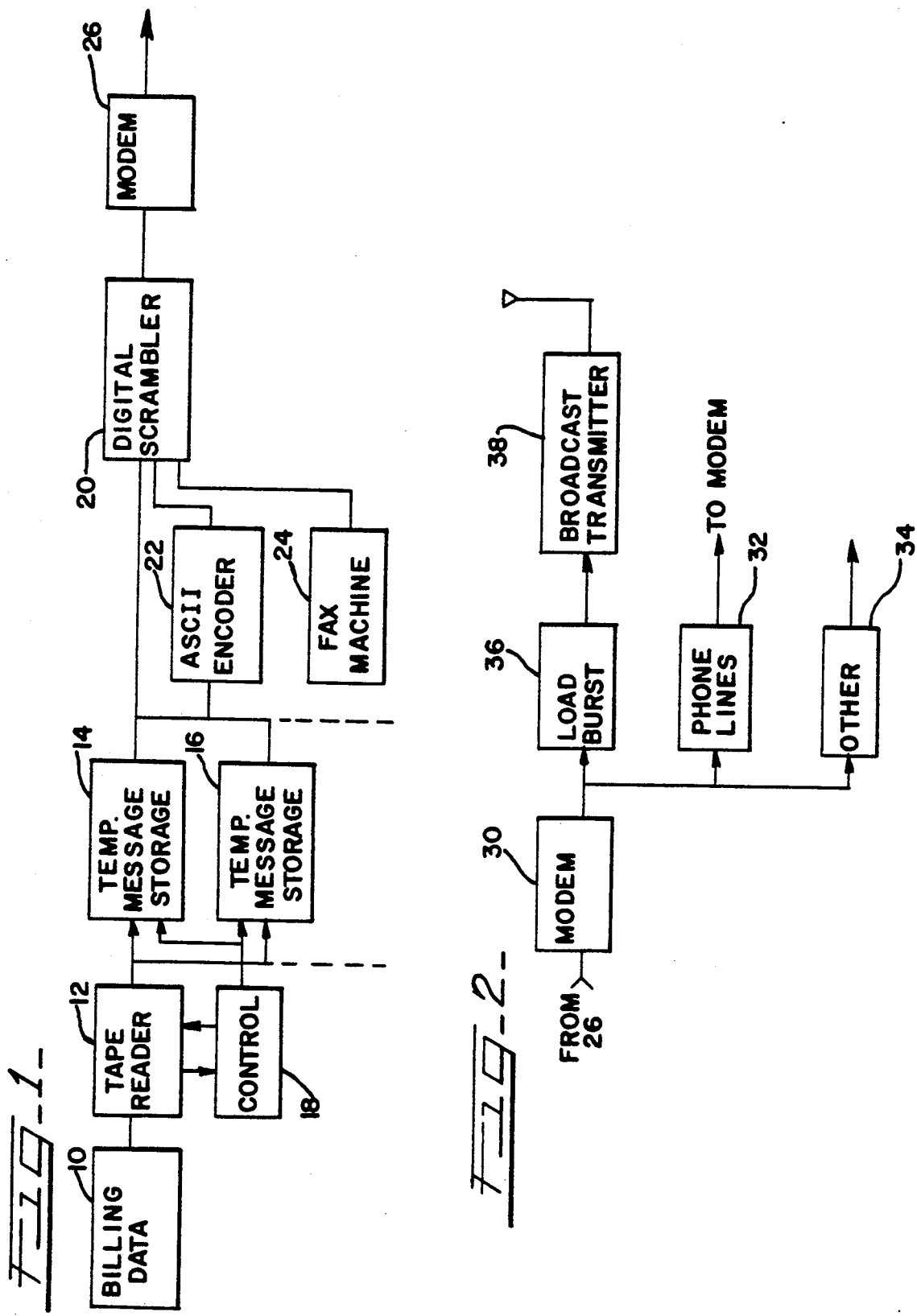

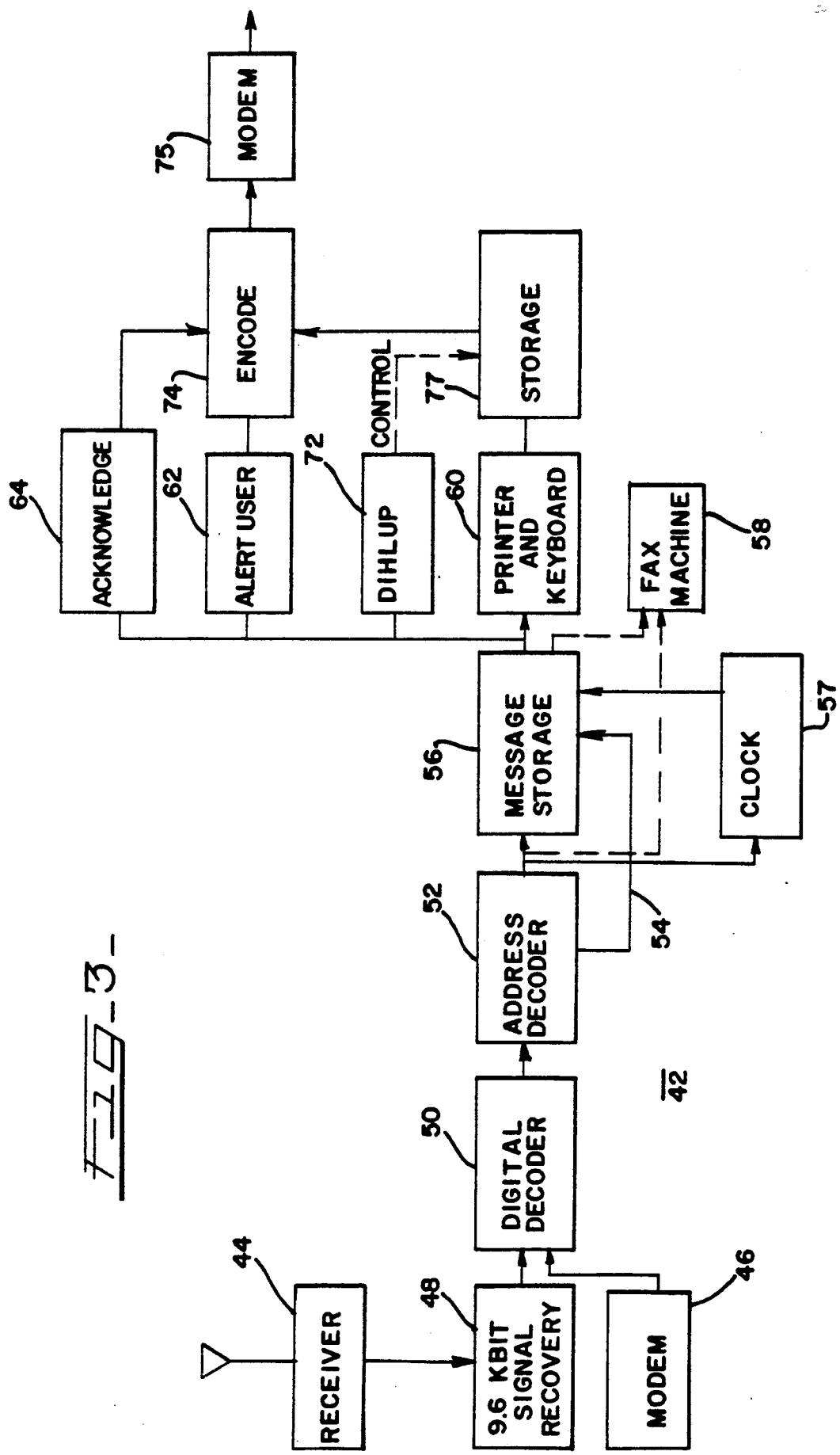

PAYMENT AUTHORIZATION AND INFORMATION DEVICE

BACKGROUND OF THE INVENTION

This invention relates to an apparatus that receives, stores and displays information and allows a user to interact with the source or sources of the information. In particular, it pertains to the receipt of a bill from a creditor and payment of the bill.

As the use of credit becomes more widespread and the cost of postage increases, it becomes economically feasible to use telecommunications to bill individual and corporate users of credit and to pay these bills by telecommunication. Telecommunication is defined here as communication at a distance as by telephone, radio, optical beams or the like. In the past, many suppliers of credit accumulated charges during a month, closed the account at the end of the month, and billed all users as of month end. This made for an uneven work load, and, as a result, many providers of credit bill on a monthly basis but close accounts evenly throughout the month to reduce a peak load at the end of the month. Mailing costs are generally such that it is not economically efficient to bill most credit-card accounts, store accounts, utilities and the like, more often than once a month.

It would be useful to have a telecommunication device for billing consumers that would avoid the cost and delay of mailing a conventional bill. Some of these costs include the preparation of individual bills, stuffing the bills in envelopes, affixing postage to the envelopes, and the costs and delays of mail delivery. In addition, interest that can be made on the average billed amount for the average amount of time gained represents a saving that would pay some or all of the cost of the telecommunication system that delivers such bills and authorizes payment of the bills.

SUMMARY OF THE INVENTION

It is an object of the present invention to provide a device for telecommunicating information to a user that will enable the automation of a creditor billing and payment cycle.

It is a further object of the present invention to use telecommunications to send a bill for services directly to a user for display and for the user to authorize payment by telecommunication to the credit provider.

Other objects will become apparent in the course of a detailed description of the invention.

A payment authorization and information system for users of credit cards and other forms of credit receives billing information or the like from the provider of the credit cards or from any such provider of credit. In the preferred embodiment, such information, encoded and identified as to the particular user, is broadcast during the vertical blanking interval of a television broadcast signal. A user has a Payment Authorization and Information Device which includes a receiver that is tuned to the particular channel on which the credit information is broadcast. The Payment Authorization and Information Device at the user's location is enabled upon receipt of its particular identifying code. When enabled, it reads the billing information into memory and sets a signal, such as a light, to alert the user to the fact that billing information has been received. The Payment Authorization and Information Device is connected by a modem to the telephone line to signal the provider that the information has been received.

At his convenience, the user operates the Payment Authorization and Information Device to print a bill and any other information that has been sent by the provider. If the user wishes to pay the bill as it stands, the Payment Authorization and Information Device, upon his direction, will automatically dial the Information Center, his financial institution or both and direct payment of the stated amount to the named provider. If the user wishes to vary the amount paid, change his address as listed or otherwise communicate with the Information Center, he may do so by typing instructions into a keyboard.

While the vertical blanking interval of a television broadcast signal represents the preferred way of sending information to users, a dedicated broadcast channel, a telephone signal, microwave transmission or a fiber-optic link could also be used.

BRIEF DESCRIPTION OF THE DRAWINGS

FIG. 1 is a block diagram of the equipment that prepares billing data to be sent.

FIG. 2 is a block diagram of the equipment that originates data transmission.

FIG. 3 is a block diagram of a portion of the equipment that is located at a user site.

DETAILED DESCRIPTION OF THE INVENTION

Figure 4:
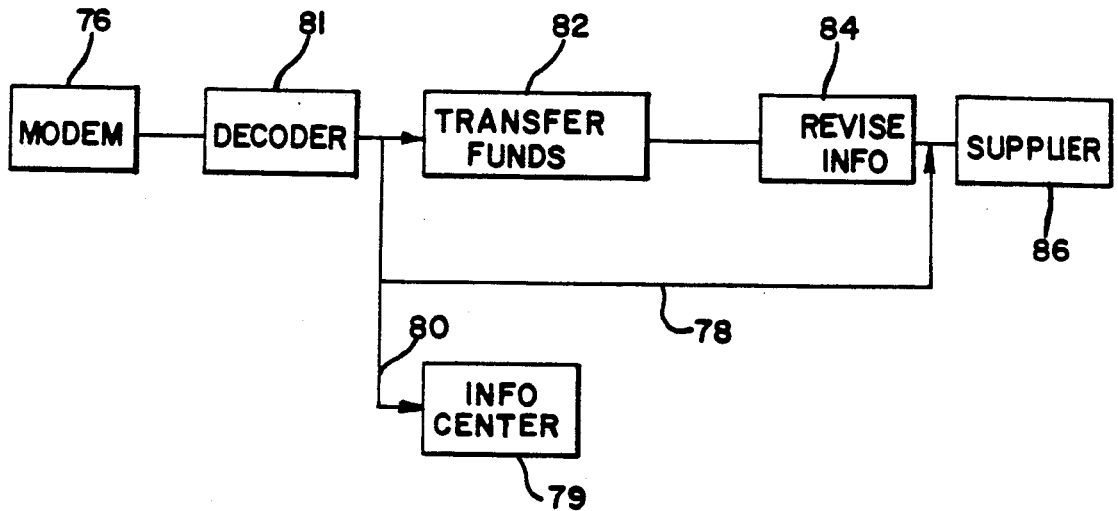
FIG. 4 is a block diagram of a further portion of the equipment that is located at a user site.

FIG. 1 is a block diagram of the equipment that prepares billing data either at a credit provider's site or at an Information Center for delivery to a site where the transmission is originated. In FIG. 1, a block 10 contains billing data for the customers. This includes customer identification information and information about the transactions that are to be billed to the customer. This would normally be supplied on tape by a credit-card issuer, a public utility, a department store or any other installation that sends bills regularly to consumers. This information might also be supplied by telephone modem. A tape reader 12 reads the billing data from the block 10 and directs the data to the temporary message storage units 14 and 16. Each unit 14 and 16 is part of a data processing area consisting of computing equipment capable of storing, processing and outputting the information collected from the credit providers. The tape reader 12 supplies an input to a control unit 18 that controls the temporary message storage units 14 and 16 and the tape reader 12.

The output of the temporary message storage units 14 and 16 will be directed through a digital scrambler 20 or may be directed through an ASCII encoder 22. A facsimile machine 24 is also shown as an additional input to the digital scrambler 20. The output of the digital scrambler 20 is preferably an encrypted data stream, typically at a bit rate of 9.6 Kbit per second or at any one of the standard bit rates, that is taken to a modem 26. The output of the digital scrambler 20 may be encrypted according to the Data Encryption Standard or other desired protocol. The output of the modem 26 is directed to a transmitting site. The bit rate of the data stream can be selected as any rate that is consistent with the bandwidth of the associated equipment. Standard bit rates currently in use range from 300 bits per second to 19,200 bits per second, and a wider range could be used.

FIG. 2 is a functional block diagram of a transmitting site that receives information from the modem 26. In FIG. 2, a modem 30 receives and demodulates the data received from the modem 26 of FIG. 1. The output of the modem 30 may be used in one of several ways. As shown in FIG. 2, the output of the modem 30 may be taken to phone lines 32 for transmission to the user by telephone. It may be taken to a block 34 which indicates other means of communication data to a user. These other means might include direct radio broadcast, cable television, a fiber-optic link, or the like. The preferred apparatus for transmitting billing information to a user is to take the information from the modem 30 to a load burst device 36. This contemplates the use of the vertical blanking interval of a television video signal to load the data in a burst of a high bit rate. A broadcast transmitter 38 then broadcasts a standard television signal containing the billing information in the vertical blanking interval.

FIG. 3 is a block diagram of a portion of the equipment that is located at the site of the user. This will be referred to as the Payment Authorization and Information Device 42. In FIG. 3, a receiver 44 receives the signal broadcast by the transmitter 38 of FIG. 2, either as direct reception or by connection to a cable system. In the alternative, a modem 46 may receive a corresponding signal over telephone lines. The signal from the receiver 44 is taken to a signal recovery unit 48 which recovers the 9.6 kilobit signal from the bursts during the vertical blanking interval. The bursts are typically at a frequency of the order of 5.7 megabits per second, which is of the order of the band width of the television broadcast signal. Recovery of the bursts and conversion of the burst signals to 9.6 Kbits produces a signal that is taken to a digital decoder 50, then to an address decoder 52. The signal from the modem 46, if used, is similarly taken to the digital decoder 50. The digital decoder 50 unscrambles the signal and the address decoder 52 determines whether its particular user is being addressed. If the message is for the particular user, a line 54 enables a message storage unit 56 and the billing information is stored in memory in the message storage unit 56 along with the time of its receipt as determined by a local clock 57. The output of the address decoder 52 and of the message storage unit 56 may also be taken to a facsimile machine 58, if desired. It is contemplated that the output of the message storage unit 56 will be taken at a time selected by the user to a printer and keyboard unit 60 to be printed. Programmed into the message storage unit 56 is a signal that will actuate a user alert unit 62. This may be a steady light, a flashing light, an audible device, or the like, to let the user know that the system contains a bill that he has not yet displayed. The message storage unit also enables an acknowledge unit 64 and a dialup unit 72. This will be seen later to send a signal back to the supplier or the information center to indicate that a bill has been received. If the information center sends a bill and does not receive an acknowledgement, it will repeat the sending of the bill until a predetermined number of failures is achieved or until it receives an acknowledgement signal. A predetermined number of failures to acknowledge will cause the preparation of a conventional bill to be mailed to the user and will also cause an inquiry into the failure of operation of the equipment. The output from the keyboard of the printer and keyboard unit 60 is taken to a storage unit 77, from which it is sent out under the control of the dialup unit 72. The output of the acknowledge unit 64, the user alert unit 62, and the storage unit 77 are taken to an encoder 74, then to a modem 75 for transmission.

FIG. 4 is a block diagram of the equipment at the an information center 79 that processes the information from the user. A modem 76 receives an input from the modem 75 of FIG. 3. The output of the modem 76 is decoded in a decoder 81 The decoded output provides an acknowledge signal to the information center 79 on a line 80, preventing the repeated sending of a bill that has been received. The output of the decoder 81 may be applied to a block 82 to direct the transfer of funds to pay the bill, following which a block 84 revises information about amounts due. The output of the block 84 is taken to the supplier 86. A line 78 bypasses the transfer of funds to take to the supplier 86 information about address changes, challenges of billed items, and the like.

Figure 5:
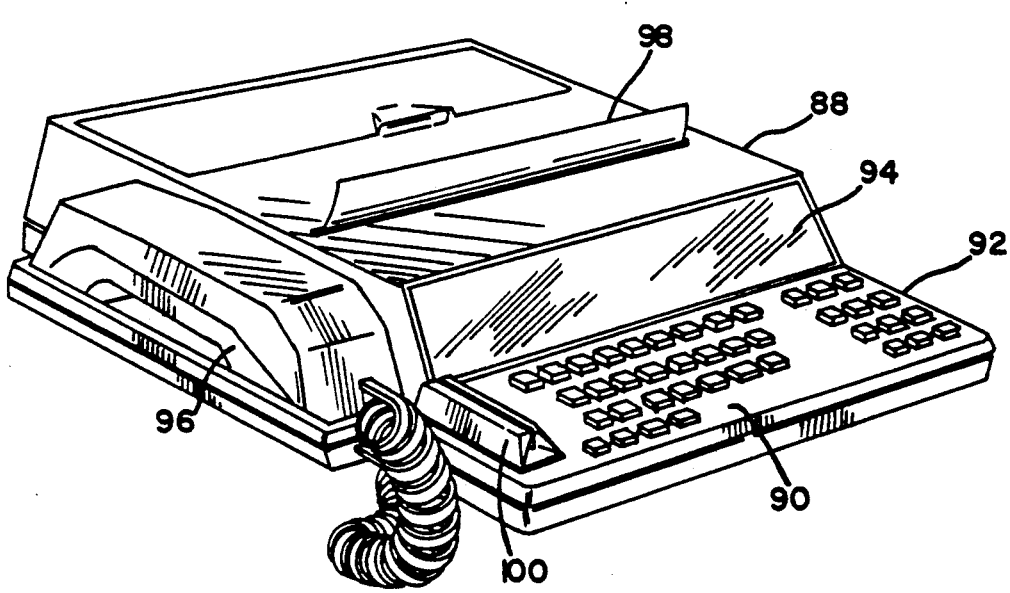
FIG. 5 is a perspective view of one embodiment of a user's terminal.

FIG. 5 is a perspective view of one embodiment of the equipment of FIGS. 3 and 4 that is located at the user. In FIG. 5, a typewriter keyboard 90 contains control keys and also enables the user to enter information to be sent to the supplier. A keypad 92 provides access for the user to telephone lines through the modem that is part of the unit of FIG. 5. A line display 94 lets the user make a visual display of a line before deciding whether to type it. A handset 96 allows the user to make calls from his Payment Authorization and Information Device 88. Paper 98 is used to print out a bill and other information that has been sent from the supplier, and it will also make a record of payments authorized and made by the user. The user may enable the Payment Authorization and Information Device 88 by use of the keypad 92, but the preferred method of identification, and a useful one in the case of a credit card bill, is to insert his credit card in a magnetic card reader 100. This provides the user with protection against access by someone other than the user to his credit records that are stored in memory in the Payment Authorization and Information Device 88. A microprocessor and a nonvolatile memory included in the Payment Authorization and Information Device 88 will enable the user to keep a record in memory of bills received, payments made and current status of his account.

A system for the use of the vertical blanking interval in a television broadcast has been proposed by PBS Enterprises, a subsidiary of the Public Broadcasting Service under the trademark National Datacast. This system provides for central insertion of data into the vertical blanking interval, satellite broadcast to local PBS stations, and rebroadcast by them of the information contained in the vertical blanking interval. In the alternative, billing data for the area served by a particular television station can be prepared for insertion in the vertical blanking interval of that station to accomplish the same result on a local basis. For such service, the receiver 44 of FIG. 3 would be tuned to the frequency of the local PBS station, if that were used, or the frequency of an appropriate commercial station if the vertical blanking interval of the commercial station were used for the purposes of the Payment Authorization and Information Device. The receiver 44, which is located in the Payment Authorization and Information Device 88 of FIGS. 5 and 6, may have its own internal receiver and antenna if the signal strength permits, or it may connect with a cable television system.

The description of specific embodiments of the present invention is intended to set forth the best mode known to the inventor for the practice of the invention. It should be taken as illustrative and not as limiting, and the scope of the invention should be limited only by the appended claims.

What is claimed is:

1. An apparatus for delivering billing information from a supplier to a user and enabling the user to direct payment of his bill, the apparatus comprising:
   a. means for reading the billing information;
   b. means for scrambling the read billing information;
   c. means for telecommunicating the read billing information to a user;
   d. means located at the site of the user for selecting read billing information addressed to the user;
   e. means for storing the selected read billing information;
   f. means for providing the user with a visible indication of the selected read billing information;
   g. means for authorizing a transfer of funds to the supplier to pay the bill; and
   h. means for communicating address changes and the like from the user to the supplier.

2. The apparatus of claim 1 wherein the means for reading the billing information comprises a tape reader.

3. The apparatus of claim 1 wherein the means for reading the billing information comprises a modem and a memory coupled to the modem to receive and store the billing information.

4. The apparatus of claim 1 wherein the means for scrambling the read billing information comprises a protocol employing the Data Encryption Standard.

5. The apparatus of claim 1 wherein the means for scrambling the read billing information comprises an ASCII encoder.

6. The apparatus of claim 1 wherein the means for telecommunicating the billing information to a user comprises a means for inserting the billing information as a burst signal modulating a television broadcast signal during a vertical blanking interval of the signal.

7. The apparatus of claim 1 wherein the means for telecommunicating the billing information to a user comprises a modem connected to the means for scrambling and to a public telephone system.

8. An apparatus for receiving directed information at the location of a user and for enabling the user to direct payment of the bill, the apparatus comprising:
   a. means for receiving directed information by telecommunication;
   b. means for storing the directed information;
   c. means for printing the directed information; and
   d. means for directing a transfer of funds to pay a desired amount in response to the directed information.

9. An apparatus for delivering billing data to a user at a site and enabling the user to direct payment of his bill, the apparatus comprising:
   a. means for reading the billing data;
   b. means for scrambling the read billing data;
   c. means for inserting the read billing data as a burst signal modulating a television broadcast signal during a vertical blanking interval of the television broadcast signal to telecommunicate the read billing data to the user;
   d. means located at the site of the user for selecting read billing data addressed to the user;
   e. means for storing the selected read billing data;
   f. means for providing the user with a visible indication of the selected read billing data;
   g. means for authorizing a transfer of funds to the supplier to pay the bill; and
   h. means for communicating address changes and the like from the user to the supplier.

* * * * *